A. G. EDDY.
Churn.
No. 37,090. Patented Dec. 9, 1862.
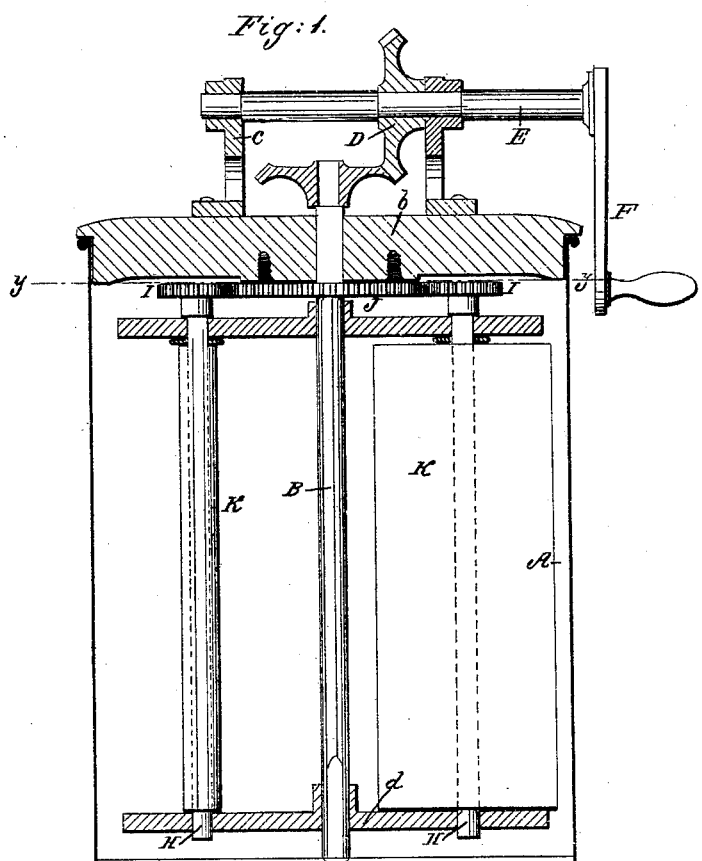
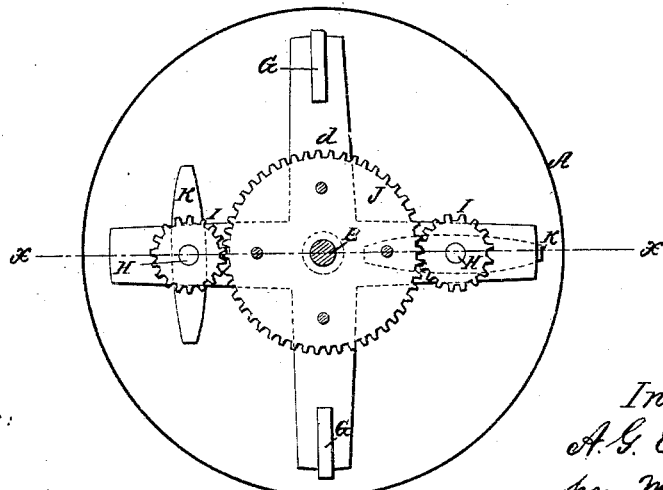
Witnesses:
J. W. Coombs
G. W. Reed
Inventor:
A. G. Eddy
per Munn & Co.
Attorneys.

UNITED STATES PATENT OFFICE.

A. G. EDDY, OF ASHFIELD, MASSACHUSETTS.

IMPROVEMENT IN CHURNS.

Specification forming part of Letters Patent No. 37,090, dated December 9, 1862.

*To all whom it may concern:*

Be it known that I, A. G. EDDY, of Ashfield, in the county of Franklin and State of Massachusetts, have invented a new and Improved Churn; and I do hereby declare that the following is a full, clear, and exact description of the same, reference being had to the accompanying drawings, making a part of this specification, in which—

Figure 1 is a vertical central section of my invention, taken in the line $xx$, Fig. 2; Fig. 2, a horizontal section of the same, taken in the line $yy$.

Similar letters of reference indicate corresponding parts in the two figures.

This invention relates to an improvement in the dasher of the churn which is of the rotary kind; and it consists in having radial arms attached to the upper and lower part of the shaft, between which arms the beaters are fitted, there being four in all, two being stationary and having a radial position with the shaft, while the other two are arranged in such a manner as to have a rotary motion on their axes independent of that caused by the rotation of the dasher-shaft, but produced by the rotation of the latter. By this arrangement it is believed that the cream will be agitated so as to cause the butter-globules to be quickly broken and butter produced within a quite limited period of time and by a moderate expenditure of power.

To enable those skilled in the art to fully understand and construct my invention, I will proceed to describe it.

A represents the body of the churn, which may be constructed of wood or metal and of cylindrical or other form. B is the dasher-shaft, which is placed vertically and centrally in the body of the churn, having its lower end stepped in the bottom $a$ of the churn and its upper bearing in the lid or cover $b$ of the same.

On the upper end of the dasher-shaft B, above the lid or cover $b$, there is placed a horizontal bevel-wheel, C, into which a corresponding wheel, D, on a horizontal shaft, E, gears. The shaft E has its bearings $c$ attached to the lid or cover $b$, and is provided with a crank, F, at its outer end. (See Fig. 1.)

On the dasher-shaft E there are placed two sets of radial arms, $d$, four in each set, one set being on the upper part of the shaft, just below the lid or cover $b$, and the other set on the lower part of the shaft, just above the bottom $a$, as shown clearly in Fig. 1. The two sets of arms are arranged in line with each other, and the ends of two opposite arms of the two sets are connected by two beaters, G G, which are formed of flat strips secured permanently and radially in the ends of the arms. In the other arms there are secured shafts H H, which are allowed to rotate freely, and which have each a pinion, I, on them above the upper set of arms. These pinions gear into a stationary wheel, J, attached to the under side of the lid or cover $b$ concentric with the dasher-shaft B. Each shaft H has a beater, K, attached it. These beaters are wider than the beaters G, and extend nearly the whole height of the space between the two sets of arms, the ends of the beaters K just clearing the arms. The beaters K project at equal distances from opposite sides of the shafts H.

From the above description it will be seen that by rotating the shaft E a rotary motion will be communicated to the dasher-shaft B through the medium of the gearing C D, and a rotary motion also communicated to the two beaters K K through the medium of the pinions I I and the stationary wheel J. These rotary beaters agitate the cream, while the beaters G G, which are fixed in the arms $d$, serve to prevent the cream assuming a regular rotary motion around the churn under the action of the beaters K. The cream, therefore, will be agitated and subjected to an efficient beating, which will break or rupture all the small butter-globules in the cream.

Having thus described my invention, what I claim as new, and desire to secure by Letters Patent, is—

A rotary churn-dasher composed of two beaters, G G, fixed in radial arms $d$, attached to the dasher-shaft B and parallel therewith, in combination with the beaters K K, arranged to operate conjointly with the beaters G G, as and for the purpose herein set forth.

A. G. EDDY.

Witnesses:
E. L. GOODNOW,
A. BONEN.